3,296,247
MIXED CELLULOSE ETHERS
Eugene D. Klug, Wilmington, Del., assignor to Hercules Incorporated, a corporation of Delaware
No Drawing. Filed July 6, 1964, Ser. No. 380,609
6 Claims. (Cl. 260—231)

The present invention relates to mixed cellulose ethers, and more particularly to hydroxyethyl hydroxypropyl cellulose having unexpected beneficial properties. Considered another way, the present invention relates to a modified hydroxypropyl cellulose having unexpected beneficial properties by virtue, in part at least, of hydroxyethyl substituent groups having been introduced to a limited degree.

My copending application Serial No. 257,064, filed on Februrary 8, 1963, and entitled, "Hydroxypropyl Cellulose and Process," discloses and claims a novel hydroxypropyl cellulose. Surprisingly, the hydroxypropyl cellulose of said copending application is characterized by the following desirable properties:
(1) Soluble in cold water.
(2) Insoluble in hot water.
(3) Thermoplastic.
(4) Soluble in a large number of polar organic solvents.
(5) Low equilibrium moisture content.

Although hydroxypropyl cellulose of the type involved in the present invention is thermoplastic, for many applications it would be desirbale if it were substantially more thermoplastic.

Although the desirability of the other properties listed hereinbefore of the hydroxypropyl cellulose involved in the present invention are probably obvious, the significance of the hot water-insoluble property should be emphasized. Insolubility in hot water is a distinct and important advantage in that it permits purification with hot water to a low ash content as compared with purification with aqueous organic liquids which not only have the disadvantage of being far more expensive but they complicate the process because they must be recovered. Furthermore, even with large amounts of organic solvents, an ash content as low as with hot water cannot be obtained.

An object of the present invention is to modify the hydroxypropyl cellulose product disclosed and claimed in my above identified copending application in such a way to substantially increase its thermoplasticity and at the same time maintain its above-mentioned other desirable properties to at least their level before said modification.

The above and other objects are accomplished in accordance with the present invention by carrying out the process which comprises reacting cellulosic material with a hydroxyethylating and a hydroxypropylating agent until the hydroxyethyl hydroxypropyl cellulose product has a hydroxyethyl M.S. of 0.05–1.0 and a hydroxypropyl M.S. of at least 2, and recovering the hydroxyethyl hydroxypropyl cellulose.

For the sake of brevity the following designations will be used sometimes hereinafter: HEHPC is hydroxyethyl hydroxypropyl cellulose, HEC is hydroxyethyl cellulose, HPC is hydroxypropyl cellulose, HE is hydroxyethyl, HP is hydroxypropyl, EO is ethylene oxide, PO is propylene oxide, and TBA is tertiary butyl alcohol.

The purpose of the following paragraph is to explain the use of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The following examples illustrate various embodiments of the present invention but they are not intended to limit the invention beyond the scope of the appended claims. In these examples and elsewhere herein, unless otherwise indicated, percent and parts are by weight and all viscosities were determined with a standard Brookfield Synchro-Lectric LVF viscometer using an aqueous solution of the cellulose ethers of the concentrations specified and at a temperature of 25° C. The hydroxyethyl hydrovypropyl cellulose product of the present invention may be prepared by carrying out the hydroxyethylation and the hydroxypropylation simultaneously or in either order.

In these examples, a measure of the hot water solubility of the hydroxyethyl hydroxypropyl cellulose was obtained from the opaque temperature. The value for the opaque temperature was obtained by raising the temperature of a 2% aqueous solution of the product at a rate of 1.5° C.–2° C. per minute. This was done in a test tube in which a thermometer was immersed. The lowest temperature at which the solution became opaque was recorded as the opaque temperature.

Thermoplasticity of the hydroxyethyl hydroxypropyl cellulose product of the present invention was determined as follows under the application of heat and pressure in an Olsen Bakelite flow tester. This is a standard testing device widely used in the plastics industry. It is described in ASTM method D569–46A (ASTM Standards, 1958, Part 9, page 393). This device is perhaps more often referred to in the art as the Tinius Olsen flow tester. The hydroxyethyl hydroxypropyl cellulose was ground to a fine powder and conditioned over $CaCl_2$ and therefore was substantially bone dry when tested. Cylindrical pellets 3/8" x 3/8" were formed from this powder in a pelleting machine. The pellet was placed in the Tinius Olsen flow tester and the plastic flow thereof measured. The log of flow was plotted in inches per two minutes against $1/T_A$, i.e., against the reciprocal of the absolute temperature, giving a straight line. From this line was read off the temperature at which the product flowed one inch in two minutes at 500 p.s.i. Further details appear in Table 1 hereinafter.

The following Examples 1–4 illustrate the preparation of the hydroxyethyl hydroxypropyl cellulose of the present invention by hydroxyethylating and hydroxypropylating simultaneously.

*Examples 1–4*

One part of finely divided wood pulp was slurried in 8.6 parts hexane, 2.35 parts TBA, and 0.2 part water. 0.2 part of 50% aqueous NaOH was added to the slurry. The slurry was stirred for an additional hour at room temperature, after which it was transferred to a pressure vessel. Then the amounts of ethylene oxide and propylene oxide shown in Table 1 hereinafter were added to the slurry. The pressure vessel was sealed and the mixture heated at 70° C. for 16 hours. Agitation was employed throughout the process. The major portion of the hexane was filtered off and the residual hexane was distilled off by passing live steam into the pressure vessel.

The hydroxyethyl hydroxypropyl cellulose product was added in small amounts to vigorously stirred water at 85° C.–95° C., the pH being maintained barely acidic to phenolphthalein by incrementally adding phosphoric acid of 85% concentration. After all of the hydroxyethyl hydroxypropyl cellulose had been added, the resulting slurry was stirred for an additional 15 minutes and then the pH was adjusted to about 7.0. Upon discontinuing the agitation of the slurry, the hydroxyethyl hydroxypropyl cellulose product settled out quickly and the water was removed by decanting. The purification of the hydroxyethyl hydroxypropyl cellulose product was completed by subjecting it to three additional steps comprising slurrying in hot water, allowing to settle and filtering, while maintaining the pH at about 7.0. The final purified hydroxyethyl hydroxypropyl cellulose product was drum dried at about 120° C. and ground to a fine powder. Further details appear in Table 1 hereinafter.

being tested must weld, i.e. the material must flow from the orifice of the extruder as a clear continuous piece.

The following investigations were carried out in order to compare the hydroxyethyl hydroxypropyl cellulose product of the present invention with hydroxyethyl cellulose alone and with physical mixtures of hydroxyethyl cellulose and hydroxypropyl cellulose. Hydroxyethyl cellulose and hydroxypropyl cellulose were mixed in equal portions by weight and dissolved in water to give a 1% solution of the mixture. This solution was tested for opaque temperature in the same way as in the above examples and found to be 41° C. Of course, hydroxyethyl cellulose alone has no opaque temperature. The flow temperature of hydroxyethyl cellulose alone and a physical mixture of equal portions of hydroxyethyl cellulose and hydroxypropyl cellulose was determined in the same manner as in the examples given hereinbefore. There was no flow of the hydroxyethyl cellulose at 169° C., which is the maximum temperature possible with the apparatus used. Although the physical mixture of hydroxyethyl cellulose and hydroxypropyl cellulose did eventually flow, the extruded article was very non-uniform in appearance. These data show that the thermo-

TABLE 1

| Example No. | Weight Ratios to Air-Dry Cellulose | | | | HE MS | HP MS | Tinius-Olsen Flow Temp., °C. at 500 p.s.i. | 2% Aqueous Soln. | | 2% Methanol Viscosity cps. |
|---|---|---|---|---|---|---|---|---|---|---|
| | $H_2O$ | NaOH | EO | PO | | | | Viscosity, cps. | Opaque Temp. °C. | |
| 1 | 0.3 | 0.1 | None | 2.98 | None | 3.5 | 134 | 1,280 | 41 | 860 |
| 2 | 0.3 | 0.1 | 0.09 | 2.86 | 0.17 | 3.34 | 118 | 1,180 | 43 | 830 |
| 3 | 0.3 | 0.1 | 0.22 | 2.76 | 0.42 | 3.65 | 96 | 590 | 45 | 480 |
| 4 | 0.3 | 0.1 | 0.45 | 2.55 | 0.85 | 3.85 | *<96 | 160 | 49 | 100 |

*The flow temperature of this product was below 96° C. but 96° C. was the lowest temperature which could be measured with the apparatus used.

The hydroxyethyl hydroxypropyl cellulose products of the present invention are soluble in water and in a large number of polar organic solvents. In carrying out these solubility tests, 1 gram of the hydroxyethyl hydroxypropyl cellulose product and 49 cc. of the solvent being tested was placed in a bottle and the bottle tumbled end-over-end 24 hours at room temperature.

The hydroxyethyl hydroxypropyl cellulose products of the present invention substantially completely dissolved in the following solvents: water, dimethyl sulfoxide, dimethyl formamide, ethylene chlorohydrin, formic acid, acetic acid, pyridine morpholine, ethanol and methanol.

The hydroxyethyl M.S. and the hydroxypropyl M.S. values of the hydroxyethyl hydroxypropyl cellulose product of the present invention are important. A hydroxyethyl M.S. of 0.05–1.0 is quite satisfactory; preferably this range will be about 0.2–0.6 for most uses. The hydroxypropyl M.S. must be at least 2 and preferably 3–10, 3–5 specifically preferred.

An important aspect of the present invention is that by the introduction of hydroxyethyl substituent groups to a low M.S. into the cellulose molecule along with hydroxypropyl substituent groups, the resulting hydroxyethyl hydroxypropyl cellulose surprisingly is far more thermoplastic than a compound produced by introducing only the hydroxypropyl substituent group into the cellulose molecule, and it also has a somewhat higher opaque temperature. This is clearly demonstrated by Table 1 hereinbefore. As is well known in the art, hydroxyethyl cellulose is not thermoplastic and does not have an opaque temperature. It would be expected that the thermoplasticity and other properties of a mixed cellulose ether (including the hydroxyethyl hydroxypropyl cellulose of the present invention) would be approximately the average of the two. Efforts to prepare articles, e.g. films, from hydroxyethyl cellulose by extrusion fail since the hydroxyethyl cellulose comes out of the orifice of the extruder in the form of crumbs, i.e. it does not weld or fuse together. In order to obtain plastic flow in the sense the term is used in the art and in the present application, the material plasticity of the hydroxyethyl hydroxypropyl cellulose product of the present invention is far greater than that of either hydroxyethyl cellulose alone or a physical mixture of hydroxyethyl cellulose and hydroxypropyl cellulose. These data also show that the opaque temperature of a physical mixture of hydroxyethyl cellulose and hydroxypropyl cellulose is no greater than that of hydroxypropyl cellulose alone.

The particular manner of carrying out the hydroxyethylation is not per se a part of the present invention; in fact, it is not critical and any conventional process is applicable. One suitable method is that described in Klug and Tennent U.S. Patent No. 2,572,039. However, the hydroxyethylation is not even restricted to a slurry process.

The hydroxypropylation is not critical either except that it must be carried out in such a manner as to produce a hydroxypropyl cellulose having the properties set forth hereinbefore. Suitable hydroxypropylation methods which may be employed include, e.g., those disclosed herein, those disclosed and claimed in my copending application identified hereinbefore and my copending application Serial No. 257,061, filed on February 8, 1963, and entitled, "Hydroxypropyl Cellulose and Process."

The practical value of the remarkably high thermoplasticity of the hydroxyethyl hydroxypropyl cellulose product of the present invention was demonstrated by carrying out experiments in which the product was extruded in the form of films. The apparatus employed was a Brabender ¾ inch extruder fitted with a 30 mil slit. 285° F. was required to extrude an unmodified hydroxypropyl cellulose prepared in accordance with the present invention, except only propylene oxide was employed as the etherifying agent. By contrast, the hydroxyethyl hydroxypropyl cellulose product of the present invention extruded very well at only 250° F. and film was clearer and more uniform than the unmodified hydroxypropyl cellulose film extruded under the same conditions, except at 285° F. In addition to being necessary for the preparation of films, good thermoplasticity is also important in making various other articles, e.g. capsules, tubes, rods, filaments, etc. Likewise, good thermoplasticity is important where the films are used in such a manner as to require heat-sealing the film.

Although the other properties of decreased viscosity and increased opaque temperature of the hydroxyethyl hydroxypropyl cellulose product of the present invention are less spectacular than the very substantial increase in thermoplasticity, they are nevertheless important and desirable. Decreased viscosity is beneficial in preparing solutions where high solids content is desired.

As many apparent and widely different embodiments of this invention may be made without departing from the spirit and scope thereof, it is to be understood that the invention is not limited to the specific embodiment thereof except as defined in the appended claims.

What I claim and desire to protect by Letters Patent is:

1. Process of preparing hydroxyethyl hydroxypropyl cellulose which comprises mixing cellulosic material, alkali, water and a water-miscible inert organic diluent, and then causing the alkali cellulose to react with a hydroxyethylating and a hydroxypropylating agent until the hydroxyethyl hydroxypropyl cellulose product has a hydroxyethyl M.S. of 0.05–1.0 and a hydroxypropyl M.S. of at least 2, and recovering the hydroxyethyl hydroxypropyl cellulose, the alkali/cellulose ratio being 0.02–0.5, the water/cellulose ratio being 0.1–4 and 0.1–2 in the alkali cellulose period and etherification period respectively.

2. Process of claim 1 wherein the hydroxypropyl M.S. is 3–5.

3. Process of claim 1 wherein the hydroxyethyl M.S. is 0.2–0.6 and the hydroxypropyl M.S. is 3–5.

4. As a new compound hydroxyethyl hydroxypropyl cellulose having a hydroxypropyl M.S. of at least 2 and a hydroxyethyl M.S. of 0.05–1.0, which is soluble in cold water, insoluble in hot water and soluble in polar organic solvents, said new compound also being substantially more thermoplastic than unmodified hydroxypropyl cellulose which has an M.S. of at least 2 and is soluble in cold water, insoluble in hot water, and soluble in polar organic solvents.

5. Product of claim 4 wherein the hydroxypropyl M.S. is 3–5.

6. Product of claim 4 wherein the hydroxyethyl M.S. is 0.2–0.6 and the hydroxypropyl M.S. is 3–5.

No references cited.

LEON J. BERCOVITZ, *Primary Examiner.*

R. W. MULCAHY, *Examiner.*